United States Patent
Okamoto et al.

(10) Patent No.: US 6,854,448 B2
(45) Date of Patent: Feb. 15, 2005

(54) FUEL INJECTION VALVE AND FUEL INJECTION SYSTEM

(75) Inventors: Yoshio Okamoto, Minori (JP); Yuzo Kadomukai, Ishioka (JP); Motoyuki Abe, Chiyoda (JP); Ayumu Miyajima, Narita (JP); Masami Nagano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 09/943,500

(22) Filed: Aug. 31, 2001

(65) Prior Publication Data
US 2002/0050266 A1 May 2, 2002

(30) Foreign Application Priority Data
Oct. 26, 2000 (JP) .......................... 2000-332129

(51) Int. Cl.⁷ .................. F02M 61/14; F02M 61/18; F02B 3/00
(52) U.S. Cl. .................. 123/470; 123/472; 123/590; 123/298; 123/305
(58) Field of Search ........................... 123/470, 472, 123/590, 298, 305; 239/533.12

(56) References Cited

U.S. PATENT DOCUMENTS

| | | | | |
|---|---|---|---|---|
| 5,501,194 A | * | 3/1996 | Kanehara et al. | 123/470 |
| 5,570,841 A | * | 11/1996 | Pace et al. | 239/585.1 |
| 5,577,481 A | * | 11/1996 | Wahba | 123/470 |
| 5,769,060 A | * | 6/1998 | Matsumoto | 123/585 |
| 6,161,782 A | * | 12/2000 | Heinbuck et al. | 239/585.1 |
| 6,170,763 B1 | * | 1/2001 | Fuchs et al. | 239/533.12 |
| 6,216,665 B1 | * | 4/2001 | Okamoto et al. | 123/305 |
| 6,405,945 B1 | * | 6/2002 | Dobrin | 239/463 |

* cited by examiner

Primary Examiner—Henry C. Yuen
Assistant Examiner—Arnold Castro
(74) Attorney, Agent, or Firm—Antonelli, Terry, Stout & Kraus, LLP (57) ABSTRACT

In an internal combustion engine, an amount of spray attaching onto an inner wall surface of an intake pipe is reduced by forming a two-directional spray of highly atomized fuel. The highly atomized two-directional spray can be obtained by a spray forming means constructed by piling a fuel in-plate forming fuel passages, a swirl plate forming fuel passages for adding swirl forces to the fuel, and an injection plate for determining injection directions of the fuel. Further, penetrations of the sprays injected toward two directions are made different from each other.

15 Claims, 7 Drawing Sheets

FUEL INJECTION VALVE AND FUEL INJECTION SYSTEM

BACKGROUND OF THE INVENTION

1. Field of the Invention

The present invention relates to a fuel injection valve, and to a technology of atomizing fuel and controlling the injecting direction.

2. Prior Art

Acceleration of atomization of fuel injected from a fuel injection valve and accurate control of the injecting direction are considered to be one of the most important problems to cope with improving fuel consumption and cleaning of exhaust gas of an internal combustion engine.

Japanese Patent Application Laid-Open No.61-234266 discloses a fuel injection system comprising a first main intake passage to be opened and closed by a first intake valve and a second main intake passage to be opened and closed by a second intake valve, the first main intake passage and the second main intake passage being opened to one of combustion chambers of an internal combustion engine; an opening-and-closing valve arranged in a main intake passage, the opening-and-closing valve being closed during low load operation and opened during high load operation; an auxiliary intake passage branched from the main intake passage at a position upstream of the opening-and-closing valve, the outlet end being opened to the first main intake passage at a position near the first intake valve, a passage area of the auxiliary passage being smaller than an area of the main intake passage; and a fuel injection system having a first injection hole and a second injection hole arranged in the main intake passage at positions downstream of the opening-and-closing valve, an injection path of the first injection hole being oriented so as to direct the injection to the first intake valve, an injection path of the second injection hole being oriented so as to direct the injection to the second intake valve.

Further, the above-referenced Japanese published application discloses that a diffusion angle of the injection path in the second injection hole is set smaller than a diffusion angle of the injection path in the first injection hole, and an amount of fuel injection through the first injection hole is set larger than an amount of fuel injection through the second injection hole. Furthermore, in the fuel injection valve, the opening area of the both injection holes are different from each other in order to make the amounts of fuel injection from the both injection holes different from each other.

Japanese Patent Application Laid-Open No.8-218986 discloses a fuel injection system comprising a fuel injection valve for injecting fuel spray inside an intake pipe, the fuel injection valve being arranged at a position upstream side of an intake valve in the intake pipe of an internal combustion engine, wherein an injection portion of the fuel injection valve comprises at least one injection hole having a curved nearly semi-arc shape and, further, the fuel injection valve is arranged so that an outermost peripheral portion of the spray is within a range of a tangent line connecting between a wall surface of an intake port and the injecting portion and may collide against an area within a back surface of the intake valve.

In the above-mentioned conventional technology, two sprays are injected from one fuel injection valve toward two directions so that each of the two sprays may be injected onto a respective one of two intake ports provided in one combustion chamber. However, fuel atomization forming the spray at that time is not sufficiently considered.

In addition, in the case where fuel is sprayed in the two directions, the traveling time until the spray reaches the combustion chamber (hereinafter, referred to as "transport time") is not always the same between the two sprays due to the deviation of intake flow rate and the resistance of flow passage caused by the structure and the shape of the intake passage. Otherwise, the structure and the shape of the intake passage (intake pipe) may be restricted by intending to make the transport time equal between the two sprays.

In the above-mentioned conventional technology, the time lag in the traveling time until the spray reaches the combustion chamber between the two sprays (hereinafter, referred to as "transport lag") is not considered. In the first of the above-mentioned two Japanese published applications, the diffusion angle of spray is made different between the first injection hole and the second injection hole but, however, without having considered varying the penetration of each spray. The penetration of spray varies depending on the degree of atomization of fuel composing the spray and, consequently, the penetration of spray can not be uniquely determined from an amount of fuel injection or an initial speed of injected fuel.

SUMMARY OF THE INVENTION

An object of the present invention is to improve atomization of fuel injected in two directions.

Another object of the present invention is to solve the problem of the time lag in the traveling time until the spray reaches the combustion chamber between the two sprays.

In order to improve atomization of fuel injected in the two directions, the fuel injection valve and the fuel injection system comprise the following structures.

The fuel injection valve comprises a valve seat and a valve disc arranged detachably from and attachably to said valve seat; two fuel injection holes arranged in a downstream side of the valve seat; and a swirl force adding means for adding a swirl force to fuel, the swirl force adding means being arranged in an upstream side of the fuel injection holes and in a downstream side of the valve seat corresponding to each of the fuel injection holes so that fuel may be sprayed through the two fuel spray holes toward two directions.

Therein, it is preferable that the swirl force adding means comprises a through hole penetrating from an upstream side end surface of a plate member to a downstream side end surface; and a fuel passage for introducing fuel into the through hole toward a direction offset in regard to a center of the through hole, and the swirl force adding means are formed in the plate member positioned in an upstream side of the fuel injection holes, and the swirl force adding means are juxtaposed in a surface direction of the plate member.

Further, it is preferable that the fuel injection valve comprises a first plate member having two fuel injection holes, the two fuel injection holes penetrating through the first plate member from an upstream side end surface to a downstream side end surface so as to be directed in directions different from each other, the two fuel injection holes being independently juxtaposed in a surface direction of the upstream side end surface and the downstream side end surface; and a second plate member having the two swirl force adding means, the two swirl force adding means being formed of two through holes penetrating through the second plate member from an upstream side end surface to a downstream side end surface and independently juxtaposed in a surface direction of the upstream side end surface and the downstream side end surface; and fuel passages provided in the individual through holes, the fuel passage being directed toward a direction offset with respect to a center of the fuel passage to communicate with the fuel passage, wherein the first plate member and the second plate member are piled up in order of the first plate member and the second plate member from the downstream side of fuel flow so that the two through holes of the second plate member individually communicate with the two fuel injection holes of the first plate member.

Therein, it is preferable that the fuel injection valve further comprises a third plate member having passage wall surfaces forming fuel passages communicating from an upstream side end surface to a downstream side end surface of the third plate member, wherein the first plate member and the second plate member and the third plate member are piled up in a downstream side of the valve seat in order of the first plate member, the second plate member and the third plate member from the downstream side so that the fuel passages of the third plate member communicate with the fuel passages of the second plate member, and the two through holes of the second plate member individually communicate with the two fuel injection holes of the first plate member.

Further, in each of the structures described above, it is preferable that penetrations of fuel sprays injected from the two fuel injection holes are made different from each other by making swirl forces added to the fuel different between the two swirl force adding means. It is possible to provide the structure of the fuel injection valve which is capable of eliminating the time lag in the traveling time until the spray injected from the fuel injection valve reaches the combustion chamber between the two sprays.

The fuel injection system comprises an intake pipe for supplying air to an internal combustion engine; an intake air flow control device for controlling an air flow flowing inside the intake pipe; and a fuel injection valve for injecting fuel, the fuel injection valve being arranged at a position downstream of the intake air flow control device inside the intake pipe, wherein the fuel injection valve comprises a valve seat and a valve disc arranged detachably from and attachably to the valve seat; two fuel injection holes arranged in a downstream side of the valve seat; and a swirl force adding means for adding a swirl force to fuel, the swirl force adding means being arranged in an upstream side of the fuel injection holes and in a downstream side of the valve seat corresponding to each of the fuel injection holes so that fuel may be sprayed through the two fuel spray holes toward two directions.

Further, the following structures are the fuel injection valve and the fuel injection system which are capable of eliminating the time lag in the traveling time until the spray injected from the fuel injection valve reaches the combustion chamber between the two sprays.

The fuel injection valve comprises a valve seat and a valve disc arranged detachably from and attachably to the valve seat; a fuel injection hole for injecting fuel in two directions, the fuel injection hole being arranged in a downstream side of the valve seat; and a means for making penetration different between fuel sprays injected in individual directions.

Further, the fuel injection system comprises an intake pipe for supplying air to an internal combustion engine; an intake air flow control device for controlling an air flow flowing inside the intake pipe; and a fuel injection valve for injecting fuel, the fuel injection valve being arranged at a position downstream of the intake air flow control device inside the intake pipe, wherein the fuel injection valve is a fuel injection valve for injecting fuel in two directions, and the fuel injection valve has a means for making penetration different between fuel sprays injected in individual directions.

Further, it is preferable that the intake air flow control device described above is arranged so that air flow rates supplied to the individual two fuel sprays injected from the fuel injection valve toward the two directions can be changed.

Further, it is preferable that a rotation shaft of an opening-and-closing valve of the intake air flow control device and a valve stem of the fuel injection valve are arranged in parallel to each other, and the fuel injection valve injects fuel so that one fuel spray between the two fuel sprays is directed to one side of a plane including the rotation shaft and the valve stem as a boundary, and the other fuel spray between the two fuel sprays is directed to the other side of the plane as the boundary.

Further, it is preferable that as the means for making the penetration different, the number of fuel injection small holes for forming one fuel spray is set to a different number between the two fuel sprays so that the penetrations of the two fuel sprays may be different from each other.

DESCRIPTION OF THE PREFERRED EMBODIMENTS

A fuel injection valve in accordance with the present invention and the fuel injection method will be described below in detail, referring to the accompanied drawings.

Figure 1A:
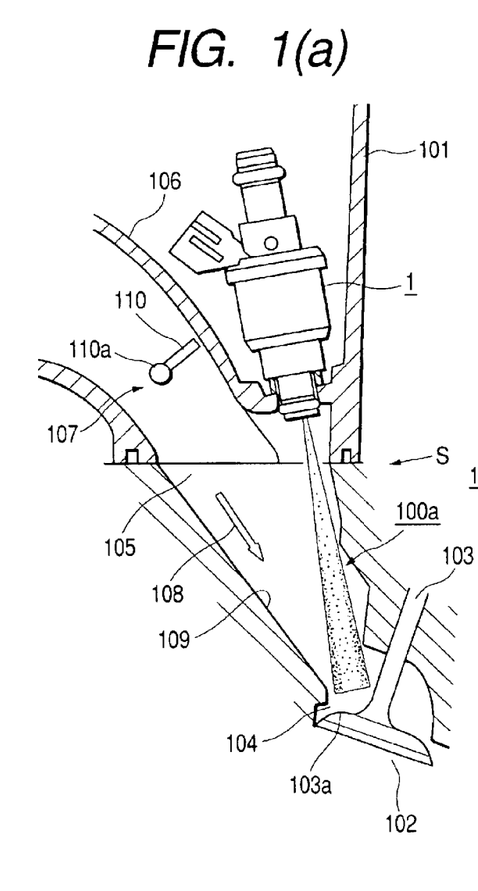
FIGS. 1(a) and 1(b) are schematic views showing an example of a fuel injection system, in accordance with the present invention, applied to an internal combustion engine.
Figure 1B:
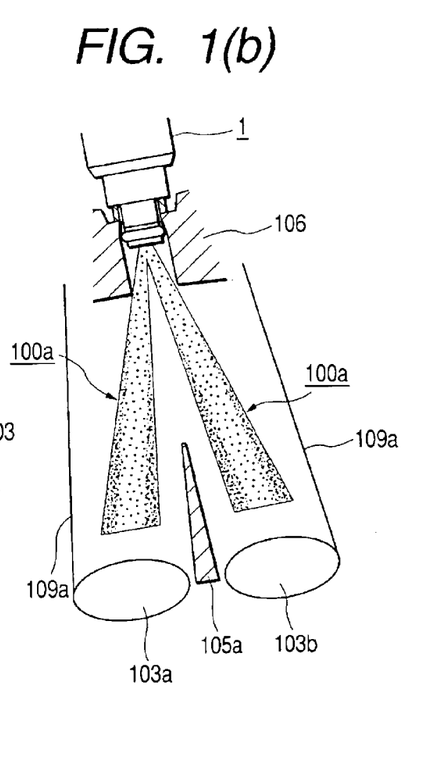

FIG. 1 (i.e., FIGS. 1(a) and 1(b)) is a view showing the state in which an embodiment of a solenoid-operated fuel injection valve in accordance with the present invention is mounted onto an intake pipe of a multi-cylinder internal combustion engine, in which FIG. 1(a) is a partially sectional view showing the state. Further, FIG. 1(b) is a view showing the positional relationship between an intake valve and the solenoid-operated fuel injection valve 1 seeing from an S-direction illustrated by an arrow in FIG. 1(a).

The reference character 101 indicates one of cylinders of the multi-cylinder internal combustion engine; the reference character 102 is a combustion chamber; the reference character 103 is an intake valve for opening and closing intake ports 104; the reference character 105 is an intake passage having a central separating wall 105a for separating the intake ports 104 and communicating the intake ports with each other in the upstream side; the reference character 106 is an intake pipe; the reference character 107 is an intake air flow control device; the reference character 108 indicates a flow of intake air; the reference character 109 (see also 109a in FIG. 1(b)) is an inner wall surface of the intake passage 105 opposite to an inner wall surface in the side of the solenoid-operated fuel injection valve 1; and the reference character 10a is a schematic view showing sprays injected from the solenoid-operated fuel injection valve 1.

The intake air flow control device 107 has an opening-and-closing valve 110 which is rotated around a rotation shaft 110a. Two of the intake ports 104 are juxtaposed for one of the combustion chambers 102, and two sprays (bi-directional spray) are injected toward individual centers of the intake ports 104. In regard to the fuel injection method, the present embodiment employs a multi-point injection (MPI) system in which each of the solenoid-operated fuel injection valves 1 is arranged in the upstream side of the intake valves 103 for each of the combustion chambers 102.

The opening-and-closing valve 110 is constructed so that the axial direction of the rotation shaft 110a is nearly parallel to a plane including two virtual center axial lines in the injection directions of the two sprays which are injected from the solenoid-operated fuel injection valve 1, and nearly perpendicular to the direction of the valve stem (or the axis of the valve or the center axis line) which agrees with the driving direction of the valve disc of the solenoid-operated fuel injection valve 1.

Although the explanation in the present embodiment is made on the case of two intake ports 104, the present embodiment may be applied to structures having three or more intake ports 104.

In order to improve the quality and the shape forming condition of the mixed gas in the cylinder, the spray 100a is required to increase the atomization degree. In addition to this, in order to reduce an amount of fuel attaching onto the inner wall surfaces of the intake pipe 106 and the intake passage 105, the directivity and the shape of the spray and, further, the injection timing are optimized. The intake air flow control device 107 generates a tumble flow by narrowing the passage area of the intake pipe 106 at closing time to increase speed of the intake air flow.

Each of the fuel sprays injected from the solenoid-operated fuel injection valve 1 is produced so as to be directed to the disc portion 103a or 103b of the intake valves 103 with a narrow injection angle capable of avoiding attaching onto the passage walls of the intake pipe 106 and the intake passage 105 and further onto the central separating wall 105a. That is, the spray 100a is of a hollow cone shape in which the density of the spray is thin in the central portion and dense in the outer portion, and is uniformly distributed on the surface of the disc portion 103a of the intake valve body 103. The bi-directional conical well-atomized sprays are formed to suppress attaching of the spray onto the walls.

A combustion test using an internal combustion engine was conducted, and it was confirmed that the exhaust gas performance and the fuel consumption performance were improved, and that by the solenoid-operated fuel injection valve 1 described above, the attaching of fuel onto the inner wall surface of the intake pipe was suppressed, and the quality and the shape forming condition of the mixed gas were improved.

Figure 2:
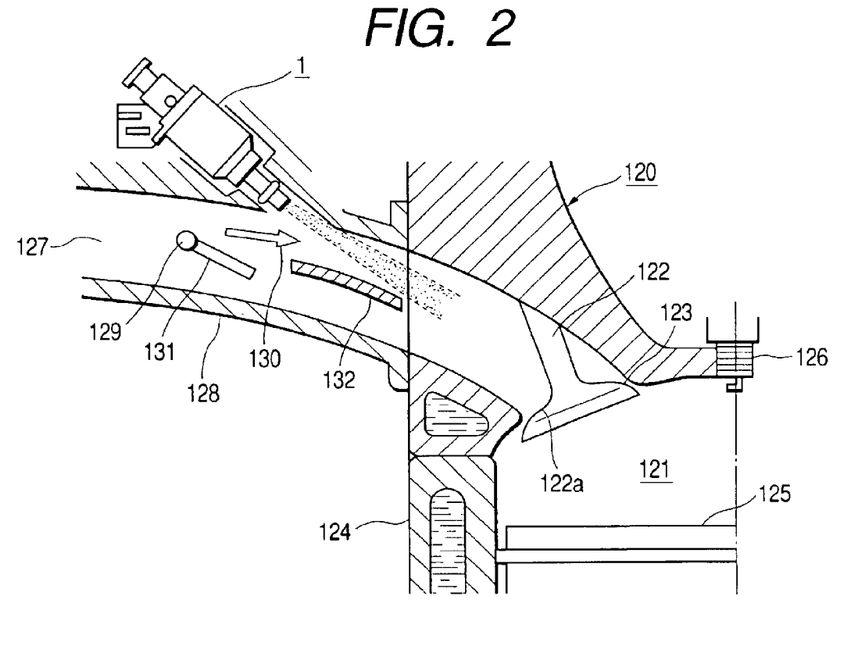
FIG. 2 is a schematic view showing an example of a fuel injection system, in accordance with the present invention, applied to an internal combustion engine of a different type.

FIG. 2 is a view showing the present embodiment of the solenoid-operated fuel injection valve which is mounted on an intake pipe of a multi-cylinder internal combustion engine of a different type.

Similarly, the reference character 120 indicates one of cylinders of the multi-cylinder internal combustion engine; the reference character 121 is a combustion chamber; the reference character 122 is an intake valve for opening and closing intake ports 123; the reference character 124 is a cylinder; the reference character 125 is a piston; and the reference character 126 is a spark plug. Further, the reference character 127 is an intake passage; the reference character 128 is an intake pipe; the reference character 129 is an intake air flow control device; the reference character 130 indicates a flow of intake air, and the intake air flow control device has an opening-and-closing valve 131. Two of the intake ports 123 are juxtaposed, and in the case of the present embodiment, the sprays are injected toward these intake ports. In the present embodiment, the multi-point injection (MPI) system is also formed.

The multi-cylinder internal combustion engine is characterized in that a plate 132 for dividing the intake passage 127 is arranged within a spray flowing zone downstream of the intake air flow control device 129, and high speed flow of intake air is generated by the dividing plate 132. A purpose of arranging the dividing plate is that the transport lag is solved while mixing of air with atomized spray is being accelerated, and the quality and the shape forming condition of the mixed gas in the cylinder are improved by optimizing the injection timing.

Similarly to the embodiment of FIG. 1, the fuel spray injected from the solenoid-operated fuel injection valve 1 is formed so as to avoid attaching onto the inter wall surface of the intake pipe 128 and to be directed to the disk portion 122a of the intake valve 122. That is, the spray is of a hollow cone shape in which the density of the spray is thin in the central portion and dense in the outer portion, and is uniformly distributed on the surface of the disc portion 122a of the intake valve 122.

Figure 3:
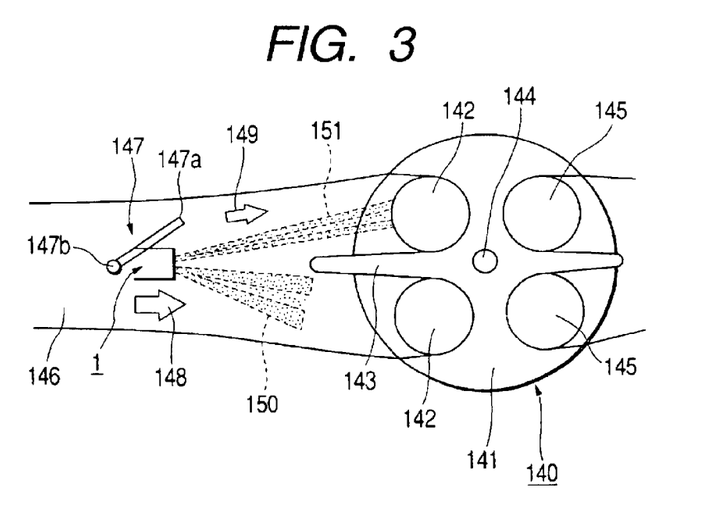
FIG. 3 is a schematic view showing another example of a fuel injection system, in accordance with the present invention, applied to an internal combustion engine.

FIG. 3 is a schematic view showing a state in which an embodiment of a solenoid-operated fuel injection valve having a different spray form is mounted on a multi-cylinder internal combustion engine of the same kind as that in FIG. 1, seeing from the upper side of the engine.

Similarly, the reference character 140 indicates one of cylinders of the multi-cylinder internal combustion engine; the reference character 141 is a combustion chamber; the reference character 142 is an intake valve; the reference character 143 is a central separating wall; the reference character 144 is a spark plug; and the reference character 145 is an exhaust valve. On the other hand, the reference character 146 is an intake passage; and the reference character 147 is a intake air flow control device. The reference characters 148 and 149 indicate flows of intake air, and the intake air flow control device 147 is arranged so that speed of the airflow in one side is increased when the opening-and-closing valve 147a of the intake air flow control device 147 is tilted toward one side.

The intake air flow control device 147 is constructed so that the axial direction of the rotation shaft 147 of the opening-and-closing valve 147a may be pointed toward the wall forming the intake passage 146 in the mounting side of the solenoid-operated fuel injection valve 1. Otherwise, the intake air flow control device 147 is constructed so that the valve shaft (or the valve axis or the central axis line) agreeing with a driven direction of the valve disc of the solenoid-operated fuel injection valve 1 and the rotation shaft 147b are on the same plane. Otherwise, the intake air flow control device 147 is constructed so that the axial direction of the rotation shaft 147a is nearly parallel to a plane including two virtual center axial lines of the injection directions of the two sprays which are injected from the solenoid-operated fuel injection valve 1. The solenoid-operated fuel injection valve 1 injects fuel so that one fuel spray between the two fuel sprays is directed to one side of a plane including the rotation shaft 147b and the valve stem of the solenoid-operated fuel injection valve 1 as a boundary, and the other fuel spray between the two fuel sprays is directed to the other side of the plane as the boundary. Further, the intake air flow control device 147 is arranged so that air flow rates individually supplied to the two fuel sprays 150 and 151 injected in two directions from the solenoid-operated fuel injection valve 1 may be varied.

In FIG. 3, the intake air flow 148 flows at a high speed, and the intake air flow 149 flows at a low speed. The two intake valves 142 are juxtaposed, and in the present embodiment, the sprays are also injected toward the intake valves. In the present embodiment, each of the solenoid-operated fuel injection valves 1 is arranged in the upstream side of the intake valves 142 for each of the combustion chambers, and the multi-point injection (MPI) system is also formed.

The present embodiment is characterized by the shape of the fuel spray injected from the solenoid-operated fuel injection valve 1. Although a detailed technique in regard to forming the spray is to be described later, a well-atomized hollow spray having a weak penetration is formed in the high speed intake air flow 148 side of the intake passage 146, and a hollow spray having a strong penetration is formed in the low speed intake air flow 149 side. As described above, by optimizing the air flow and the spray form, the transport lag of the fuel spray is solved, and the quality of the mixed gas (stratification of the mixed gas) produced in the combustion chamber 141 is improved to stabilize the combustion.

A combustion test using an internal combustion engine was conducted, and it was confirmed that the ignitability was good, and the stable combustion zone was expanded toward a lean burning side, and the exhaust gas performance and the fuel consumption performance were improved.

Description will be made below on the structure and the operation of the fuel injection valve 1 capable of the above-described spray, referring to FIG. 4 to FIG. 8.

Figure 4:
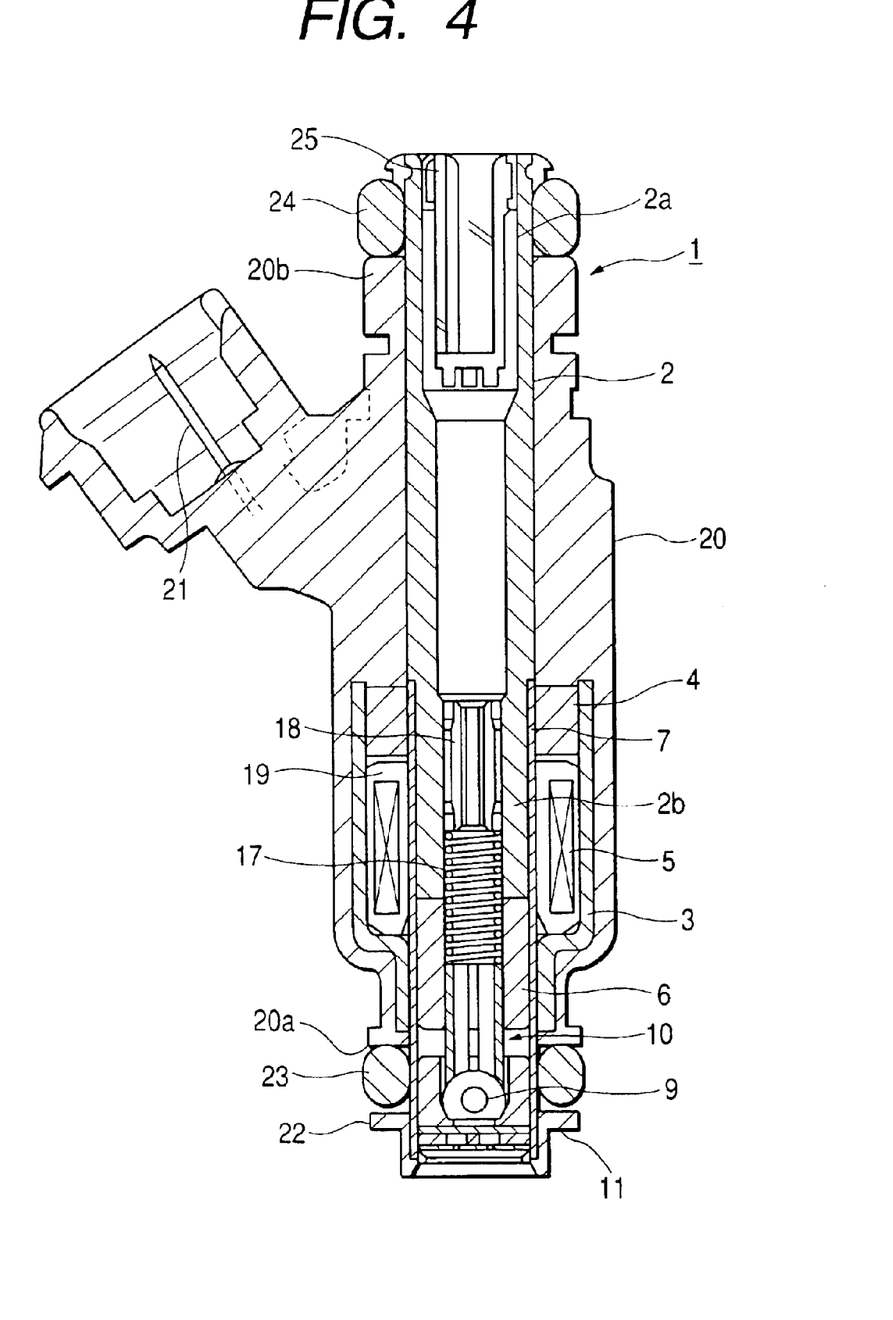
FIG. 4 is a vertical cross-sectional view showing a fuel injection valve, in accordance with the present invention.

FIG. 4 is a vertical cross-sectional view showing a solenoid-operated fuel injection valve 1 in accordance with the present invention. The structure and the operation will be described below.

The solenoid-operated fuel injection valve 1 injects fuel by opening and closing the valve seat portion according to ON-OFF signals of a duty cycle calculated by a control unit.

The magnetic circuit is comprised of a nearly cylindrical tube 2 which serves as a core, the cylindrical tube 2 having a fuel introduction portion in one opening end 2a and an opening end 2b; a tube-shaped piece 3 having a function as a yoke, a part of the tube-shaped piece 3 being fixed to a thin-walled cylindrical member 7 one end of which is inserted over and fixed to an outer peripheral portion near the opening portion 2b of the cylindrical tube 2, the tube-shaped piece 2 being made of a ferromagnetic material and formed so as to at least partially surround a solenoid coil 5; a plug part 4 for closing one end of the tube-shaped piece 3; and a cylindrical anchor 6, the cylindrical anchor 6 being arranged opposite to an end surface of the opening end 2b of the cylindrical tube 2 acting as the core through a gap.

Figure 5:
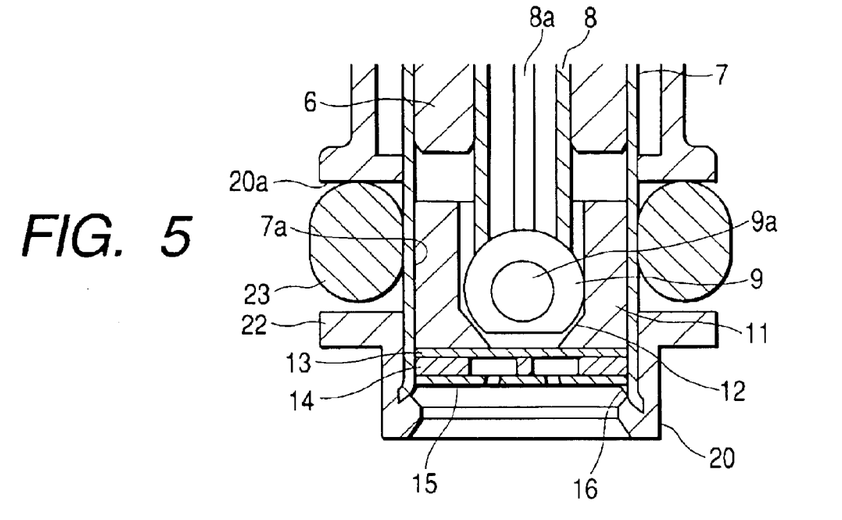
FIG. 5 is an enlarged vertical cross-sectional view showing an injection nozzle portion of the fuel injection valve in FIG. 4.

A valve body 10 is comprised of a rod 8 arranged on the inner peripheral surface of the anchor 6, the rod 8 being formed by rolling round a plate member having a partially opened portion 8a; and a ball 9 fixed to the other opening end portion of the rod 8 by welding. The valve body 10 is guided by the anchor 6 and the outer peripheral portion of the ball 9. A plurality of cut surfaces 9a for making fuel pass through are formed in the ball 9. The ball 9 is in contact with a valve seat surface 12 formed in a valve seat member 11. A guide surface for guiding the ball 9 is formed on the inner radial portion of the valve seat member 11. The above details are illustrated in FIG. 5.

The valve seat member 11 is press-inserted into an inner peripheral surface 7a of one end of the thin-walled cylinder member 7 made of a non-magnetic material or a weak magnetic material, and a plate with fuel swirl mechanisms having a function of atomization and a plate with holes (through holes) having a shape (including the size) required for controlling the injection direction and the spray pattern are press-inserted into and fixed to the further downstream portion of the thin-walled cylinder member 7. The plate with the fuel swirl mechanism is formed of a fuel-in plate 13 and a swirl plate 14, and the plate with holes for controlling the injection direction and the spray pattern is formed of an injection plate 15. In the present embodiment, the fuel-in plate 13, the swirl plate 14 and the injection plate 15 are press-inserted into and fixed to the thin-walled cylinder member 7 in the downstream side of the valve seat member 11 in this order from the upstream side.

Each of the plates described above is a plate member of which a dimension in the thickness direction (a dimension in the direction of the valve axis in the condition the plate is assembled in the solenoid-operated fuel injection valve 1) is a very small value compared to a dimension in a direction (a dimension in the radial direction) intersecting with the thickness direction at right angle.

The reference character 16 is a welded portion through laser welding. In this case, the welded portion corresponds to the outer periphery of the injection plate 15, the welded portion prevents fuel from leaking to the outside.

When the valve seat member 11, the fuel-in plate 13, the swirl plate 14 and the injection plate 16 are inserted into and fixed to the thin-walled cylinder member 7, the gap between the end surface of the anchor 6 of the valve body 10 and the end surface of the opening end 2b of the tube-shaped piece 3 acting as the core is adjusted. That is, the gap is formed as a moving distance of the valve body 10 in the axial direction. Further, the valve body 10 is pushed to the valve seat surface 12 of the valve seat member 11 by a return spring 17, and the pressing force is adjusted by an axial position of a rolled bushing 18 formed by rolling a plate material in a roll-shape.

Further, in the present embodiment, the bottom end surface of the cylindrical tube 2 acting as the core serves as a stopper for receiving the anchor 6 at valve opening operation. Therefore, it is preferable that the bottom end surface of the cylindrical tube 2 and the top end surface of the anchor 6 are plated with chromium or the like through electroplating or the like.

A coil 5 for energizing the magnetic circuit is wound around a bobbin 19. Terminals 21 of the coil are connected to terminals of the control unit, not shown.

The outer peripheries of the cylindrical tube 2 acting as the core and the tube-shaped piece 3 having the function of the yoke are surrounded with a plastic mold 20 formed through injection molding. In this case, the coil terminals 21 are molded together in a one-piece structure. Further, an O-ring 23 for sealing fuel is arranged between one end surface 20a of the plastic mold 20 and a bushing 22 inserted into and fixed to the end portion 7a of the cylinder member 7. Further, an O-ring 24 for sealing fuel is arranged in the side of the other end 20b. Therein, the reference character 25 is a filter which is arranged in order to prevent particles or extraneous objects contained in the fuel from entering between the ball 9 and the valve seat surface 12, that is, what is called the valve seat side of the valve.

The operation of the solenoid-operated fuel injection valve 1 constructed as described above will be described below.

The valve body 10 is vertically moved in the axial direction to open and close the gap between the ball 9 and the valve seat surface 12 according to an electric ON-OFF signal applied to the solenoid coil 5, and thereby fuel injection control is performed. As the electric signal is applied to the coil 5, the magnetic circuit is formed by the cylindrical tube 2 acting as the core, the tube-shaped piece 3 having the function of yoke and the anchor 6, and the anchor 6 is attracted toward the side of the cylindrical tube 2. As the anchor 6 is moved, the ball 9 united with the anchor 6 is also moved to be detached from the valve seat surface 12 of the valve seat member 11 and to release the fuel passage in the upstream side of the fuel-in plate 13.

Fuel flows inside of the solenoid-operated fuel injection valve 1 through the filter 25, and flows downstream through the inside of the anchor 6 and the opening portion of the rod 8 linked to the anchor 6, and further flows from the valve seat surface 12 of the valve seat member 11 to the outer peripheral portion of the fuel-in plate 13, and the fuel is added with a swirl force by the swirl plate 14 and injected through the injection plate 15.

Here, the structures of the fuel-in plate 13, the swirl plate 14 and the injection plate 15 will be described, referring to FIG. 6 to FIG. 8.

Figure 6A:
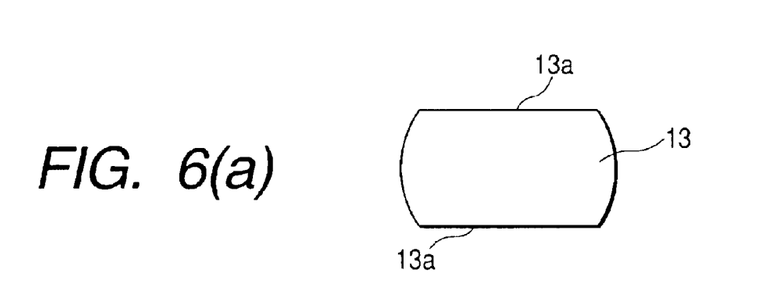
FIGS. 6(a)–6(c) are front views explaining various kinds of plates applicable to the present invention.
Figure 6B:
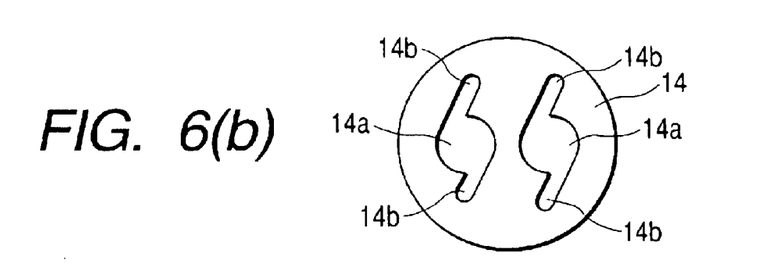
Figure 6C:
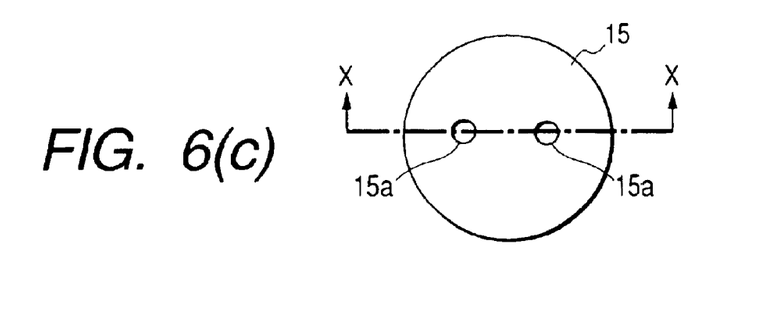

FIGS. 6(a), 6(b) and 6(c) are front views showing each of the plates. FIG. 6(a) shows the fuel-in plate 13 which has D-cut surfaces 13a. The D-cut surfaces 13a form passage wall surfaces of fuel passages communicating the upstream side end surface of the fuel-in plate 13 with the downstream side end surface. FIG. 6 (b) shows the swirl plate 14. The swirl plate 14 comprises two through holes (swirl chambers 14a) penetrating from the upstream side end surface to the downstream side end surface, the through holes 14a being independently juxtaposed in the surface direction of both of the upstream side end surface and the downstream side end surface; and fuel passages (offset passages 14b) are provided through each of the swirl chamber 14a, the fuel passage 14b communicating with the swirl chamber so as to be directed in a direction offset to the center of the swirl chamber 14a. The swirl chamber 14a is formed so that the section perpendicular to the valve axis is circular. In this embodiment, a pair (two) of the offset passages 14b are provided for each of the swirl chambers 14a, and the offset passage 14b is connected to the swirl chamber 14a in the tangential direction. The offset passage 14b composes a fuel passage as a swirl force adding means for adding a swirl force to the fuel passing through there. The swirl chamber 14a may be included in the swirl force adding means. FIG. 6(c) shows the injection plate 15. The injection plate 15 comprises two fuel injection holes 15a comprised of two through holes 15a independently juxtaposed in the surface direction of both of the upstream side end surface and the downstream side end surface, and the two fuel injection holes 15a penetrate from the upstream side end surface to the downstream side end surface so as to direct directions different from each other. Each of the two fuel injection holes 15a is formed at a position corresponding to the center of each of the swirl chambers 14a. These plates 13, 14 and 15 are formed of a thin plate metallic material (0.08 mm to 0.5 mm in), and a large amount of the plates can be manufactured without deviation because stamping work and etching work or the like may be used for forming the plates.

The D-cut surface 13a of axial direction passage provided in the fuel-in plate 13 has a function forming the fuel passage, and accordingly the fuel passage may be formed as a through hole in the valve axial direction at a position corresponding to the offset passage 14b in the downstream side.

Figure 7A:
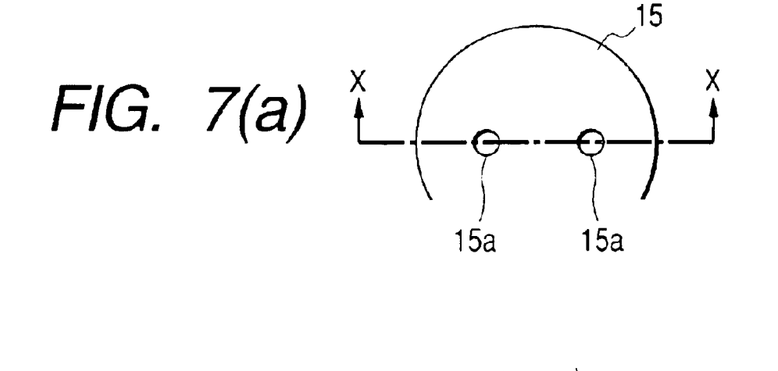
FIG. 7(a) is a partial front view of an injection plate and FIG. 7(b) is a cross-sectional view taken along section line X—X of FIG. 7(a).
Figure 7B:
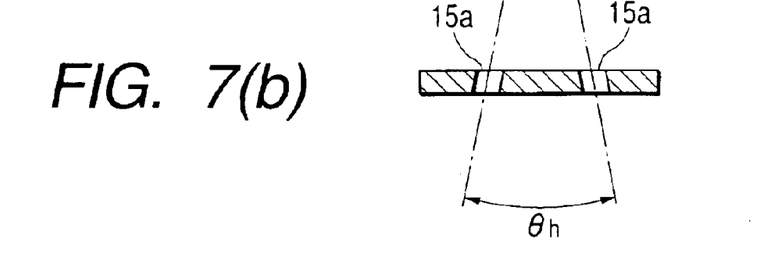

FIGS. 7(a)–7(b) illustrate an example of the structure of the fuel injection holes 15a formed in the injection plate 15, in which FIG. 7(b) is a cross-sectional view along section lines X—X of FIG. 7(a) which correcponds to that of FIG. 6(c). The center lines of the two fuel injection holes 15a are tilted by 5° to 10° so that the interval between the two center lines becomes wider toward the downstream side, and the angle between the center lines θh is set within such an angle that the centers of sprays individually are directed to central positions of the intake valves in an internal combustion engine of a two-intake valve type to be described later.

Figure 8A:
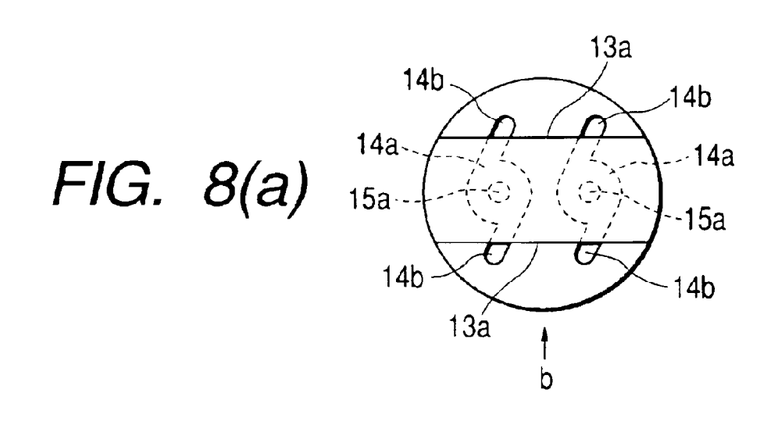
FIGS. 8(a) and 8(b) are a front view and a side view, respectively, showing an assembly of plates applicable to the present invention.
Figure 8B:
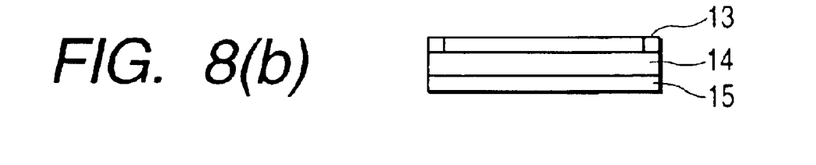

FIGS. 8(a)–8(c) illustrate a state of the spray generating means constructed by assembling the fuel-in plate 13, the swirl plate 14 and the injection plate 15. FIG. 8(a) is the front view seeing from the upstream side in the direction of the valve axis, and FIG. 8(b) is the side view seeing from the direction of an arrow b in FIG. 8(a). Although the assembling work is performed when the plates are assembled in the injection valve 1, as described above, the spray generating means may be assembled in advance by bonding the plates as shown in the figure. Therein, the fuel-in plate 13 and the swirl plate 14 may be formed of a non-metallic material, and the function can be satisfied even in such a case.

The fuel passage will be described below. Fuel flows from the upper side toward the offset passages 14b exposed from the D-cut surfaces 13a of the fuel-in plate 13, and then flows into the swirl chambers 14a communicating the pairs of the offset passages 14b. At that time, the fuel is added with a swirl force. The swirling fuel flows down to the fuel injection holes 15a positioned under the centers of the swirl chambers to be injected outside the fuel injection valve 1.

Figure 9A:
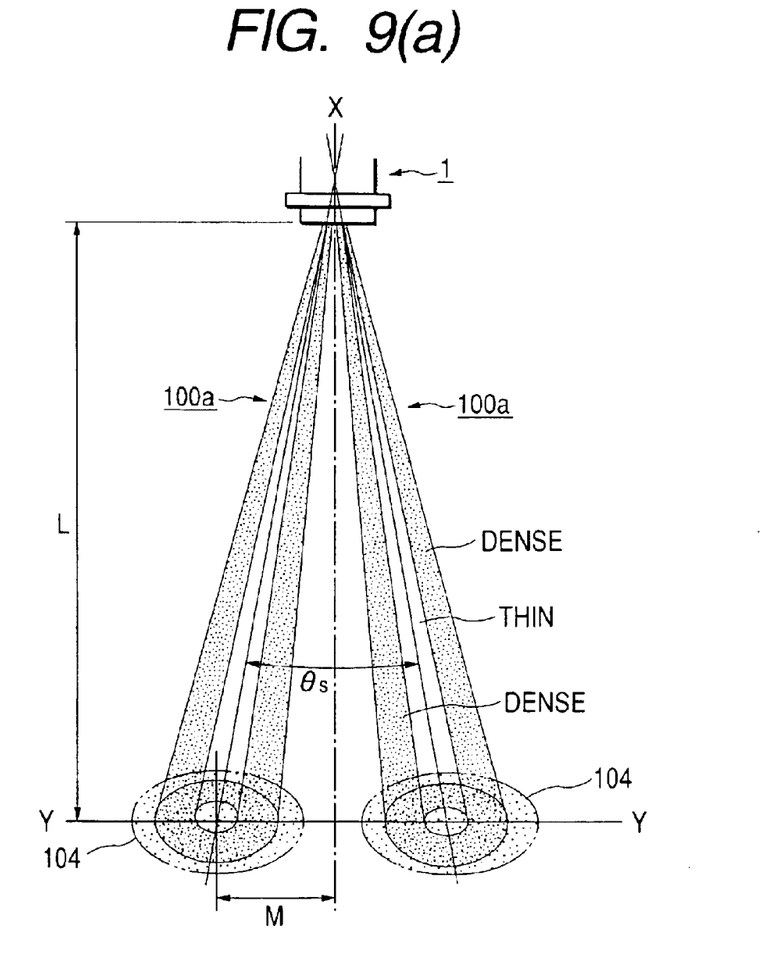
FIGS. 9(a) and 9(b) are an explanatory side view and a graph diagram depicting the spray patterns and flow distribution, indicative of the present invention.
Figure 9B:
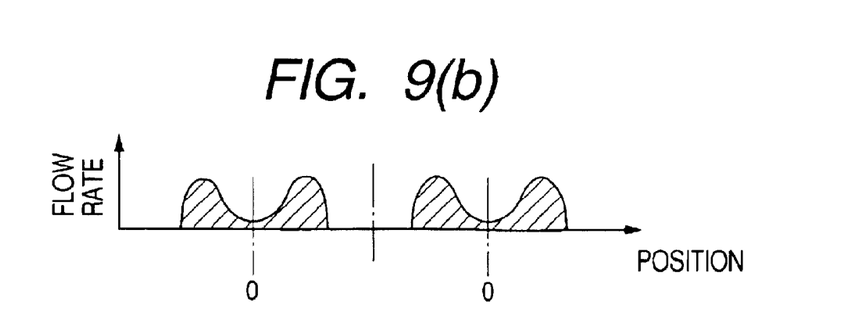

FIG. 9 shows a form of the injected spray. The spray is made bi-directional. The illustrated case is that swirl intensities of the fuel for forming the sprays are designed so as to be equal to each other. The spray 10a is of a hollow cone shape in which the density of the spray is thin in the central portion and dense in the outer (peripheral) portion. FIG. 9(b) shows the flow distribution measured by a trapping pan method. The flow distribution is nearly symmetric with respect to the center O of flow rate. The angle θs geometrically calculated from the distance between the center O of flow rate and the central axis of the solenoid-operated fuel injection valve 1 and the length L of the perpendicular drawn from the top end portion of the solenoid-operated fuel injection valve 1 down to the segment Y—Y connecting the centers of the two intake ports 104 is equivalent to the angle θh of FIG. 7. The sprays 100a are distributed uniformly on the surfaces of the disc portions 103a, 103b of the intake valves 103 avoiding the central portions of the disc portions 103a, 103b. The spray angle θ s is set to a value 10° to 20°. That is, the spray angle θs is set to a value equal to or smaller than the center angle of the intake valves in the internal combustion engine of a two intake valve type. The reason why the angle is set as described above is that it is found that the droplets of the spray are dragged outward by intake air flow, that is, dragged toward the inner wall surface 109a side of the intake pipe.

In order to make the penetration different between the two sprays 150 and 151, as shown in FIG. 3, the intensities of the swirled fuel produced by the swirl plate 14 are made different from each other. In detail, this can be attained by adjusting the sectional area of the passage or the amount of offset of the offset passage 14b. The penetration becomes strong when the offset amount is decreased, and the penetration becomes weak when the passage sectional area is decreased.

In the structure of the embodiment of the solenoid-operated fuel injection valve 1 shown in FIG. 1 to FIG. 3, the following considerations are taken, and the following features are obtained.

(1) Improvement of atomization of the injected fuel is performed by adding the swirl force to the fuel using the swirl plate 14. The fuel introduced from the upper side (upstream side) flows to the offset passage 14b which is offset with respect to the central axis of the swirl plate 14, and is added with the swirl force by the offset passage 14b to flow into the swirl chamber 14a. Since the flow path from the axial direction passage 13a formed on the fuel-in plate arranged upstream to the swirl chamber 14a forms a lossless flow passage allowing a desired amount of fuel to flow, the pressure energy is effectively converted to the swirling energy to accelerate the atomization when the fuel is injected through the fuel injection hole 15a formed in the injection plate 15.

(2) The control of spray direction is performed by the injection plate 15. The two tilted fuel injection holes 15a and 15b are provided in the injection plate 15. In the case of each of the embodiment described above, the injection directions are bi-directional, and are controlled so as to be directed onto the intake valves. The fuel injection holes 15a are positioned under (in the downstream of) the centers of the swirl chambers 14a formed in the swirl plate 14 in the upstream side to effectively inject the swirling fuel. The tilted angle of the fuel injection hole 15a is formed in 5° to 10° so as to avoid interference between the two sprays.

(3) The adjustment of the injected amount is performed by accurately manufacturing the plates 13, 14 and 15 so that each has a very small thickness compared to the diameter. That is, the D-cut surface 13a formed in the fuel-in plate 13, the swirl chamber 14a formed in the swirl plate 14 and the fuel injection hole 15a formed in the injection plate 15 are manufactured through the press-stamping work, the etching work or the like, and the plates are assembled in the injection valve 1. At assembling the plates, no large unbalanced load is applied to the fuel-in plate 13 and the swirl plate 14 because the assembling load is applied through the injection plate 15. Although the outer periphery 16 of the injection plate 15 is fixed by laser welding or the like, the fuel injection holes 15a are hardly influenced by the thermal deformation because the holes are distant from the welded fixed portion.

(4) The very thin plate material is used for the fuel-in plate 13 and the injection plate 15. Since the thickness is, for example, 0.1 mm to 0.3 mm, the workability is very easy, and accordingly, the plates can be manufactured through the press-stamping work, the etching work or the like. Therefore, the deviations in the dimension and the shape can be made very small even the plates are massively manufactured. Further, the plates can be economically manufactured due to the mass-production.

Furthermore, different kinds of materials (for example, a non-metallic material etc.) having good workability may be used for the fuel-in plate 13 and the swirl plate 14, and thereby the productivity can be further improved.

By forming the fuel-in plate 13, the swirl plate 14 and the injection plate 15 in a unit as shown in FIG. 8, assembling of the plates to the main body of the fuel injection valve can be easily performed. By doing so, handling of the parts in a manufacturing line becomes easy, and in the viewpoint of prevention of attaching of extraneous objects after working and the dimension control, the handling also becomes easy. Particularly, there is an advantage in cost because quality control can be performed at the part level and, accordingly, it is unnecessary to dispose off-specification products of the fuel injection valve body themselves.

The other embodiments of solenoid-operated fuel injection valves will be described below, referring to FIG. 10 and FIG. 11.

Figure 10:
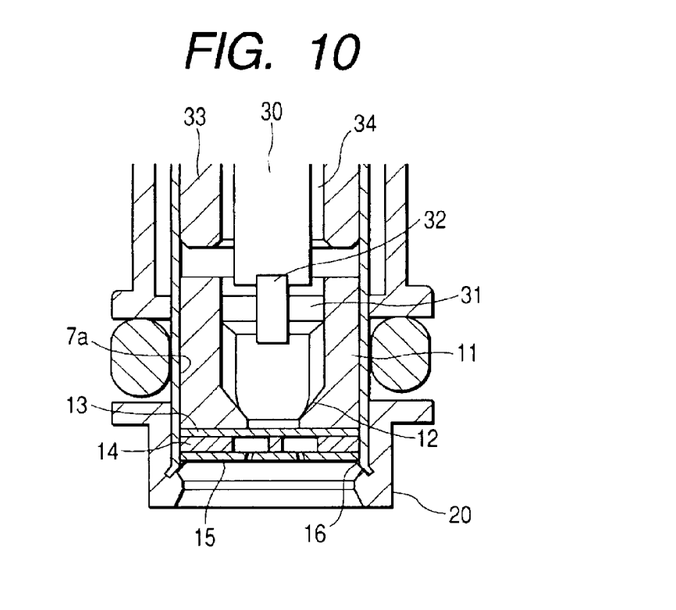
FIG. 10 is a vertical cross-sectional view showing an injection nozzle portion when a needle valve is used.

Instead of the ball valve in FIG. 1 to FIG. 3, a needle valve 30 may be used for the valve body, as shown in FIG. 10.

In the present embodiment, fuel flows around the valve body, and is supplied to the contact portion between a valve seat surface 12 and the needle valve 30 from a vertical passage 34 of an anchor 33 through a fuel passage portion 31 provided in a valve body guide portion 32. In this structure, the same operations and the same effects as those in the embodiment of FIG. 1 to FIG. 3 can be also attained.

Figure 11A:
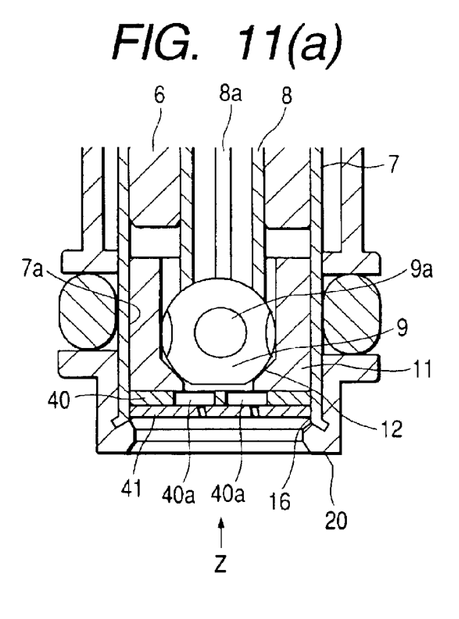
FIGS. 11(a) and 11(b) are a vertical view and a cross-sectional view thereof showing another embodiment of an injection nozzle portion.
Figure 11B:
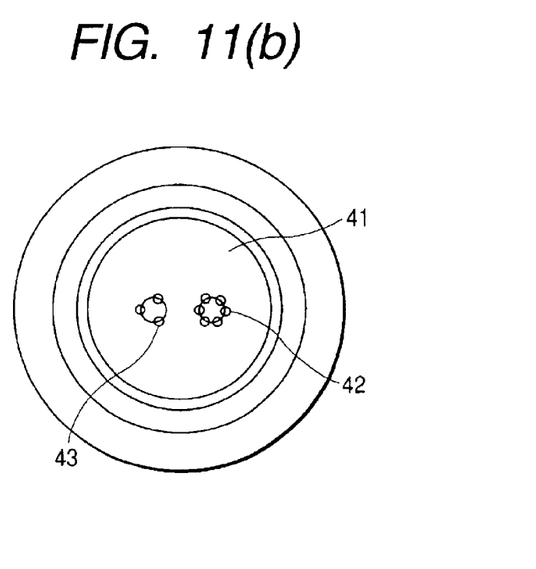

FIG. 11(a) is a vertical sectional view showing the valve top end portion of a solenoid-operated fuel injection valve having an injection plate 41 which has a plurality of small holes as a different method of generating a spray form. FIG. 11(b) is a view seeing from the direction shown by an arrow Z in FIG. 11 (a). When the ball 9 is driven and detached from the valve seat surface 12 to release the fuel passage in the upstream side of a fuel-in plate 40, fuel flows from the valve seat surface 12 to an injection plate 41 through vertical holes 40a of the fuel-in plate 40. There, the fuel is injected through the plurality of small holes 42, 43 formed in the injection plate 41. In this case, since number of the small holes 42 and number of the small holes 43 are different from each other, the forms of the injected sprays are accordingly different from each other. That is, the penetration of the spray injected from the small holes 42 is strong, and the penetration of the spray injected from the small holes 43 is weak. The spray form of this kind is suitable for the internal combustion engine shown in FIG. 3. In this structure, the same operations and the same effects as those in the embodiment of FIG. 1 to FIG. 3 can be also attained. The present embodiment has an advantage in that various kinds of spray forms can be obtained by varying the diameter and number of the holes, and the angle of the holes.

According to the present invention, atomization of fuel injected toward two directions can be improved by arranging the swirl force adding means for adding a swirl force to the fuel in the upstream side of the fuel injection holes and in the downstream side of the valve seat corresponding to each of the fuel injection holes.

Further, the time lag in the traveling time until the spray reaches to the combustion chamber between the two fuel sprays can be solved by providing a means for making the penetration different between the fuel sprays injected toward two directions.

What is claimed is:

1. A fuel injection system comprising an intake pipe for supplying air to an internal combustion engine; an intake air flow control device for controlling an air flow flowing inside said intake pipe; and a fuel injection valve for injecting fuel, said fuel injection valve being arranged at a position downstream of said intake air flow control device inside said intake pipe, wherein
said fuel injection valve is a fuel injection valve for injecting fuel in two directions, and said fuel injection valve has a means for making penetration different between fuel sprays injected in individual directions.

2. A fuel injection system according to claim 1,
wherein said intake air flow control device is arranged so that air flow rates supplied to the individual two fuel sprays injected from said fuel injection valve toward the two directions can be changed.

3. A fuel injection system according to claim 2,
wherein a rotation shaft of an opening-and-closing valve of said intake air flow control device and a valve stem of said fuel injection valve are arranged in parallel to each other, and
said fuel injection valve injects fuel so that one fuel spray between said two fuel sprays is directed to one side of a plane including said rotation shaft and said valve stem as a boundary, and the other fuel spray between said two fuel sprays is directed to the other side of said plane as the boundary.

4. A fuel injection system according to claim 1,
wherein said fuel injection valve includes at least first and second fuel injection holes to permit fuel to be injected respectively as two separate sprays in two different directions from said first and second fuel injection holes,
wherein said means for making penetration different makes the penetration of a fuel spray from the first fuel injection hole different than the penetration of a fuel spray from the second fuel injection hole.

5. A fuel injection system according to claim 4,
wherein said intake airflow control device controls airflow to provide a higher speed airflow adjacent the fuel spray from the first fuel injection hole than an airflow adjacent the fuel spray from the second fuel injection hole to provide a weakening effect on the fuel spray from the first fuel injection hole compared to the effect of the airflow on the fuel spray from the second fuel injection hole.

6. A fuel injection system according to claim 4,
wherein said means for making penetration different comprises means adjacent to said first and second fuel injection holes for making an intensity of the fuel spray injected from the first fuel injection holes different than an intensity of the fuel spray injected from the second fuel injection holes.

7. A fuel injection system according to claim 6,
wherein said intake airflow control device controls airflow to provide a higher speed airflow adjacent the fuel spray from the first fuel injection hole than an airflow adjacent the fuel spray from the second fuel injection hole to provide a weakening effect on the fuel spray from the first fuel injection hole compared to the effect of the airflow on the fuel spray from the second fuel injection hole.

8. A fuel injection system according to claim 6,
wherein said means for making the intensity of the fuel sprays different comprises a swirl plate to make the intensity of swirled fuel for the spray from the first fuel injection holes different than the intensity of swirl fuel for the spray from the second fuel injection holes.

9. A fuel injection system according to claim 8,
wherein said intake airflow control device controls airflow to provide a higher speed airflow adjacent the fuel spray from the first fuel injection hole than an airflow adjacent the fuel spray from the second fuel injection hole to provide a weakening effect on the fuel spray from the first fuel injection hole compared to the effect of the airflow on the fuel spray from the second fuel injection hole.

10. A fuel injection system according to claim 1,
wherein as said means for making the penetration different, number of fuel injection small holes for forming one fuel spray is set to a different number between said two fuel spray so that the penetrations of said two fuel sprays may be different from each other.

11. A fuel injection valve comprising:
a valve seat and a valve disc arranged detachably from and attachably to said valve seat;
at least first and second fuel injection holes to permit fuel to be injected respectively as two separate sprays in two different directions from said first and second fuel injection holes, said fuel injection holes being arranged in a downstream side of said valve seat; and
means for making penetration of a fuel spray from the first fuel injection hole different than the penetration of a fuel spray from the second fuel injection hole.

12. A fuel injection valve according to claim 11,
wherein said means for making penetration different comprises means adjacent to said first and second fuel injection holes for making an intensity of the fuel spray injected from the first fuel injection holes different than an intensity of the fuel spray injected from the second fuel injection holes.

13. A fuel injection valve according to claim 12,
wherein said means for making the intensity of the fuel sprays different comprises a swirl plate to make the intensity of swirled fuel for the spray from the first fuel injection holes different than the intensity of swirl fuel for the spray from the second fuel injection holes.

14. A fuel injection valve comprising:
a valve seat and a valve disc arranged detachably from and attachably to said valve seat;
two fuel injection holes arranged in a downstream side of said valve seat; and
swirl force adding means for adding a swirl force to fuel, said swirl force adding means being arranged in an upstream side of said fuel injection holes and in a downstream side of said valve seat corresponding to each of said fuel injection holes so that fuel may be sprayed through said two fuel injection holes toward two directions;
a first plate member having two fuel injection holes, said two fuel injection holes penetrating through said first plate member from an upstream side end surface to a downstream side end surface so as to be directed in directions different from each other, said two fuel injection holes being independently juxtaposed in a surface direction of the upstream side end surface and the downstream side end surface;

a second plate member having said two swirl force adding means, said two swirl force adding means being formed of two through holes penetrating through said second plate member from an upstream side end surface to a downstream side end surface and independently juxtaposed in a surface direction of the upstream side end surface and the downstream side end surface; and fuel passages provided in said individual through holes, said fuel passage being directed toward a direction offset with respect to a center of said fuel passage to communicate with said fuel passage; and a third plate member having passage wall surfaces forming fuel passages communicating from an upstream side end surface to a downstream side end surface of said third plate member, wherein said first plate member and said second plate member and said third plate member are piled up in a downstream side of said valve seat in order of said first plate member, said second plate member and said third plate member from the downstream side so that said fuel passages of said third plate member communicate with said fuel passages of said second plate member, and said two through holes of said second plate member individually communicate with said two fuel injection holes of said first plate member.

15. A fuel injection valve according to claim 14, wherein penetrations of fuel sprays injected from said two fuel injection holes are made different from each other by making swirl forces added to the fuel different between said two swirl force adding means.

* * * * *